United States Patent Office 3,580,728
Patented May 25, 1971

3,580,728
PROCESS FOR MAKING EXPANDED
SNACK PRODUCT
Clayton O. Gulstad, Coon Rapids, and Francis J. Eastburn, Minneapolis, Minn., assignors to General Mills, Inc.
No Drawing. Filed Aug. 28, 1967, Ser. No. 663,501
Int. Cl. A23l 1/10
U.S. Cl. 99—81                                                                 13 Claims

ABSTRACT OF THE DISCLOSURE

A new food product and process for forming it. A flour is formed by explosively puffing a cereal grain and milling the puffed grain to form a pulverulent material. A dough, formed by combining the flour with water and one or more flavoring ingredients, is then formed into pieces which are subjected to intense heat to produce the final product.

---

The present invention relates to a novel food product and to a process for making such a food product. More specifically, it pertains to an improved process for making an expanded food product from a composition which includes a starch containing cereal grain, in which the starch is at least partially gelatinized.

Various apparatus and processes have been devised for forming edible snack food products from a composition which includes a starch containing cereal, in which the starch is processed so that it is at least partially gelatinized. According to the known prior art, one common way of gelatinizing the starch is to cook the grain at an elevated temperature for a prescribed period of time. In some instances the grain is cooked at atmospheric pressure, while in other instances the grain is cooked under pressurized conditions. The length of time required to cook the grain varies of course, and is dependent upon the degree of gelatinization desired, the temperature and pressure at which the cooking takes place, the specific grain being cooked, and the like. In many instances, an extensive period of time is required to obtain a cooked product having the desired characteristics, which can subsequently be formed into a specific type of snack product. Although a number of snack products are known which vary according to taste, texture, color, size, and shape, constant efforts are being made to form new products which differ in one way or another from those which are already available, and which overcome the disadvantages and problems involved in producing them.

Accordingly, one object of the present invention is to provide an improved process for forming a food product.

Another object is to provide a process for producing a food product which is formed from a cereal dough which is at least partially gelatinized.

A further object is to provide a novel process for obtaining an edible snack product having excellent texture and eating qualities.

A still further object is to provide an improved process for forming an edible product from a cereal base which is at least partially gelatinized, in which the gelatinization is achieved in a relatively short time.

Another object is to provide a process for forming a food product in which certain steps of the process can be performed at one station and at one time, and subsequent steps performed at a different station and at a different time.

A further object is to produce a novel edible food product.

Other objects and advantages of this invention will become apparent from a consideration of the following detailed description of the invention.

In general, the invention involves preparing a flour which is at least partially gelatinized, by explosively puffing a cereal grain thereby substantially expanding it, and thereafter milling the puffed grain so that a pulverulent material or flour is formed. The flour thus formed, can be cooled and stored for future use, or it can be immediately further processed to form a desired food product. To form such a product, the flour is combined and mixed with a prescribed amount of water to form a dough; if desired, other ingredients such as salt or other flavoring ingredients, can be mixed with the flour and water to form a dough having a prescribed flavor, texture and color. The dough is then formed into pieces having a desired size and shape, which are then subjected to an elevated temperature to form an expanded food product.

Although a number of specific examples are described hereinafter which illustrate some of the types of products which can be formed by practicing the present invention, the process is basically the same for each example. The apparatus used for performing each operation are commercially available items, and while a specific kind or type of apparatus might be specified, it must be realized that any number of similar devices might be satisfactorily used as well.

Since the herein described food product is formed from a composition which includes a cereal grain, one of the first factors to be considered is what type of grain is to be used. Any number of starch containing grains can be used, including for example, corn, rice, wheat, barley, oats, etc., as well as mixtures of two or more of them.

The selected cereal grain is explosively puffed in a puffing gun so that it is expanded in size from about 5-10 times its original size. Any type of gun puffing apparatus can be used, as the grain can be puffed in either a batch or a continuous puffing gun. Moreover, the grain can be expanded into a vacuum or into atmospheric pressure. As known to those skilled in the art, the grains are puffed by sudden release from a heated confined area into an area having a larger volume and a lower pressure; such a puffing operation causes the starch in the grain to gelatinize. The extent of starch gelatinization of course, depends on the specific processing conditions used. It has been found in the present instance, that optimum results are obtained when complete gelatinization is obtained. It sohuld be pointed out however, that in some instances, less than complete gelatinization may be adequate. As known to those skilled in the art, there are various methods and procedures known for determining the amount of starch gelatinization which has been achieved. No detailed description of such procedures will be described herein.

For purposes of illustration, U.S. Pat. 3,231,387 illustrates a puffing gun which can be used with desirable results. In such an apparatus, the feed material is continuously fed through a rotary valve into a long puffing gun and is discharged from the end of the puffing gun. In a typical operation, the grain is fed into the chamber at a feed rate which ranges from 10 to 30 pounds per minute, along with steam at about 60–130 p.s.i.g., and preferably about 100 p.s.i.g., at a temperature ranging from about 375–500° F. The barrel is maintained at a temperature of about 500–700° F. The grain is maintained in the gun for about 15–120 seconds and discharged continuously to yield a puffed or expanded product which is substantially larger than the original grain. The starch of such a puffed product is at least partially gelatinized and in many instances, complete gelatinization can be achieved.

Where a batch gun is used, the moisture of the feed material is preferably somewhat higher than normally used in a continuous puffing operation. Batch gun conditions are in the range of the following: gun temperature 325–600° F., internal pressure 80–125 p.s.i.g., residence time 3–15 minutes.

The whole grain, having a moisture content ranging from about 8–14%, is admitted into the puffing chamber where it is subjected to high heat and temperautre. When discharged, the kernels are expanded to about 5–10 times their original size, and their moisture content is reduced to about 3–8%. In this regard, it should be realized, that the moisture level of the incoming grain might vary, depending upon the particular puffing procedure used, the particular grain being puffed, and the amount of expansion desired. In certain instances for example, it might be preferred to temper or steep the grain before it is puffed. When a batch gun is used for example, it might be preferred to increase the moisture content of the grain to 15–22%.

After the grain has been puffed it is discharged from the gun at a fairly high temperature, e.g., 120–150° F.; consequently it might be necessary or desirable to cool the product. This is particularly true if the puffed product is to be stored for a period of time before it is further processed. Any known method of cooling the product can be employed to lower the temperature to a suitable level, e.g., room temperature. If the product is to be immediately processed further, such cooling might not be necessary or desirable.

After the grain has been puffed, it is admitted into a mill where it is ground into flour. Various types of well-known and commercially available impact mills can be used with satisfactory results for milling the puffed grain. Mechanical impact mills having hammers and/or whizzers therein which impact against the particles and aid in moving them through the grinding chamber are commonly known and used for grinding purposes. Mills which might be used include Fitzpatrick Mills, Raymond Vertical Mills, Alpine Pin Mills, Schutz-O'Neill Mills, and the like. As known to those skilled in the art, such machines include a plurality of hammers and/or whizzers which are mounted within a grinding chamber in such a manner that the hammers are caused to rotate about a prescribed axis. The material to be pulverized is introduced into the chamber where the particles are accelerated to a high speed by the rotating hammers and reduced in size by attrition with the hammers and the walls of the grinding chamber. The particle size distribution of the flour is not overly critical, and its size range might vary, depending upon the specific grain being used, the desired texture of the final food product, and the like. Generally, it has been found that best results are obtained if the particle size is less than about 600 microns.

Following the grinding operation, a dough is formed by combining and mixing the milled flour with water, and if desired, one or more flavoring or coloring agents. Illustrative of the type of mixer satisfactorily used is a commercial size Hobart blender, Model No. M-802. The amount of water to be added will vary dependent upon the amount of moisture desired in the mixed dough. It has been found that for a given amount of flour, its total moisture content, including its original moisture content, should range from about 25–50% and preferably about 35% based upon total weight. Various kinds of flavoring ingredients can be used for achieving a food product with a specific distinctive flavor. Ingredients which give the product a bacon flavor for example, have proven to be quite delectable; and cheese flavoring ingredients have also resulted in a savory product.

It has also been found that certain other ingredients which improve the overall characteristics of the product might be mixed with the dough. Such ingredients might include a small amount of sodium bicarbonate, which among other things affects browning reactions in the product as well as the product flavor; sugar which likewise affects browning and overall flavor characteristics of the product; salt; and food coloring. The ingredients should be mixed long enough so that the gelatinized flour absorbs the desired moisture.

After the ingredients have been mixed to form a dough, is formed into pieces having a desired shape and size. This operation can be performed in different manners. One procedure is to form an extrudate by forcing the dough through a die opening in an extruder. Extruders of different kinds are known which will work satisfactorily. One type of high pressure continuous extruder which has been used is a Royle extruder manufactured by John Royle and Sons of Paterson, N.J.; such an extruder includes an elongated barrel in which a screw having a continuous flight, is rotatably mounted. As known, the screw forces the dough through a die opening having a prescribed size and shape, so that an extrudate is formed having substantially the same shape as the die opening. If desired of course, other types of pressure extruders might be used as well, such as piston extruders. It has been found that optimum results are obtained when the extruder is water cooled so that the temperature of the dough and the extrudate are maintained below a prescribed temperature. Since the starch is partially or wholly gelatinized during puffing, it is unnecessary to cook the dough during the extrusion process. Moreover, if the extrudate is sliced, the dough has a tendency to stick to the cutter blade if the product temperature is too hot. It has been found that best results are obtained when the product temperature is maintained below 140° F. and preferably about 80–110° F. It has been found that when a continuous screw extruder is used, the product should be extruded under a pressure of about 2200–3500 p.s.i.g. When a piston type extruder is used, lower pressures can be used, e.g., as low as 150 p.s.i.g. provided however, that the moisture content of the dough is relatively high, e.g., 45–48%.

After the extrudate is formed, it is preferably immediately cut into segments of predetermined length. If desired of course, the extrudate might be allowed to temper or cool for a period of time before it is sliced.

It should be realized that there are other ways of forming the dough into pieces as well. It has been found that the dough can be worked into an elastic and pliable state in a suitable apparatus, and then rolled or flattened into a sheet having a prescribed thickness, e.g., 0.025–0.075 inch, by the use of sheeting rolls. The sheeted dough is then cut and formed into pieces having a desired shape. Various methods and types of apparatus are known and can be devised to form the pliable and elastic dough into pieces of desired shape and size in this manner.

Following the formation of the dough into pieces, the segments or sliced pieces are dried. If the pieces are too moist, they will not puff appreciably when subsequently subjected to intense heating. For best results, the moisture of the dough pieces should be reduced to a level ranging from about 5–25%, and preferably about 6–14%. Various drying procedures and techniques might be employed. A suitable product can be obtained by drying at room temperature for a prescribed period of time; if time is important however, the pieces can be dried at an elevated temperature, e.g., 140° F., by appropriate means, for a shorter period of time, with good air circulation.

After the pieces have been dried to the desired moisture level, they are subjected to intense heat for a short period of time, Although a number of methods can be used, such as salt puffing, or vacuum puffing, it is preferred that the product be deep-fat fried. The product is fried at about 350–400° F. for a time period of about 25–80 seconds. This normally reduces the moisture content of the product to a range of about 1–3%, and causes the product to puff or expand somewhat in size. The product is then removed from the deep fat fryer, dusted with salt so that about 2% by weight of salt is obtained, and the product allowed to cool. The oil content of the final product might range from about 15–25%, and preferably about 17%, depending upon the type of product being formed. After cooling, the product is either immediately packaged, or it can be stored for future packaging.

The invention will be better understood with reference to the following examples:

EXAMPLE I

Three hundred pounds of Grade No. 1 extra fancy polished rice having a moisture content of about 11.0% were fed into a continuous puffing gun at a feed rate of about 10 lbs./min. The following gun conditions were employed:

Steam pressure—100 p.s.i.g.
Steam temperature—395° F.
Barrel angle (below horizontal)—3°
Barrel rotation—52 r.p.m.
Barrel temperature—640° F.
Puffing nozzle orifice diameter—½ inch
Barrel size (diam. × length)—10 inch diam. × 12 feet long The kernels were retained within the gun for approximately 50–60 seconds, and when discharged, they had a moisture content of about 7.1%, they had expanded to about 8 times their original size, they had a temperature of about 140° F., and they were substantially completely gelatinized.

The puffed rice was then milled into flour by admitting it into a Fitz mill using a 1B screen. A sieve size analysis of the milled product (100 gm. sample sieved 5 minutes on a Ro-Tap sifter) gave the following results:

TABLE I

| Through | Over[1] | Percent product |
|---|---|---|
| 0 | 25 wire (710μ) | 2 |
| 25 wire | 45 wire (350μ) | 26 |
| 45 wire | 70 wire (210μ) | 32 |
| 70 wire | 100 wire (149μ) | 17 |
| 100 wire | | 23 |

[1] U.S. Standard Screen.

A dough was formed by combining and mixing 2580 grams of the above rice flour, 204 grams of bacon flavoring, 15.0 grams sodium bicarbonate and 0.4 grams colorant together in a Hobart blender, with enough water to raise the total moisture content of the dough to about 35%. A soda solution was first formed by combining the soda with part of the water so that it would more readily disperse with the dry ingredients. The bacon flavoring was formed by combining 150 grams dry granular meat flavor with 43 grams sucrose, 9 grams salt and 2 grams of liquid smoke. The dough ingredients were mixed for about 20 minutes to allow a sufficient amount of time for the gelantinized flour to absorb the moisture.

The dough was then introduced into a Royle continuous extruder having a length to diameter ratio of 14:1. The dough was extruded through an elongate die opening or slit, at a pressure of about 3200 p.s.i.g. and at a feed rate of about 3.5 pounds per minute. The extruder jacket was water cooled so that the dough temperature was maintained at about 110°–120° F. The extrudate thus formed was immediately cut into slices or chips about ¾ inch long.

After extruding and cutting, the chips were passed through a continuous rotary drier which was supplied with nonheated air. The residence time of the chips within the drier was about 3 minutes, and the purpose was to surface dry the chips, thus making it easier to spread the chips onto a tray. The chips were then placed on perforated trays and allowed to dry for about 44 hours at room temperature. After this period of time, the moisture content was reduced from about 35% to about 8.1%.

After drying, the chips were deep fat fried in coconut oil at a temperature of 400° F. for about 30 seconds, in a standard restaurant size basket fryer. During the frying operation, the chips expanded appreciably in size; the moisture content of the chips was reduced to about 1.5%; and the oil content of the fried product was about 18%. The chips were then dusted with salt so that they had an additional 2% by weight of salt. The resulting finished product had excellent texture, a pleasant aroma, an appetizing appearance, and a delicious bacon-like flavor. The crispy, crunchy texture of the product added to its palatability.

EXAMPLE II

Example I was repeated except that the dough was formed having a moisture content of about 45%, a piston type extruder having a slit-type die opening was used, and the chips were dried by placing them on perforated trays within a hot air drier for about 4 hours. The temperature within the drier was maintained at about 140° F., and the moisture level of the chips was reduced to about 7.7%. The product thus formed was considered very good.

EXAMPLE III

A dough was formed by combining and mixing 327 grams of the above puffed rice flour with 80.4 milliliters of a soda solution formed of 2.5% soda and 97.5% water, and 177 ml. of water. The moisture content of the dough was about 47%. Chips were formed from an extrudate forced through a slit opening in a piston-type extruder. The chips were dried to a moisture level of about 14.8%, and then deep fat fried for about 20 seconds in coconut oil having a temperature of about 400° F. The fried chips were then dusted and coated with a powdered smokey cheese flavoring composition so that the final product had about 14.0% by weight of the cheese flavoring. The resulting product had a cheese flavor and it was considered good as to texture and appearance.

EXAMPLE IV

A dough having a moisture content of about 40%, was formed by combining and mixing 200 grams of the rice flour formed in Example I, in a Hobart mixer with 50 grams sucrose, 10 grams of powdered orange flavoring, 12 milliliters liquid food coloring, and 128 ml. water. The resulting dough was then sheeted between sheeting rolls to an approximate thickness of 0.030 inch, cut into one inch diameter chips, and dried for about 16 hours at room temperature to a moisture content of approximately 11%. The dried chips were then salt puffed in salt having a temperature of about 380° F. for about 15 seconds. The chips puffed to about twice their original size, they had a fruit flavor, and their texture and color were considered good.

In the above description, a disclosure of the principals of this invention is presented, together with some of the specific examples by which the invention might be carried out.

Now, therefore, we claim:

1. A process for forming a food product comprising explosively puffing a cereal grain by subjecting it to an elevated temperature and pressure, and instantaneously releasing said pressure whereby steam explosion of the grain is obtained, said puffed grain becoming at least partially gelatinized during said puffing, forming a pulverulent material by milling said puffed grain, forming a dough by combining and mixing said material with a prescribed amount of water, forming said dough into pieces having a prescribed size and shape, drying said pieces to a prescribed moisture level, and subjecting the pieces to intense heat for a prescribed period of time.

2. The process of claim 1 wherein said pieces are dried to a moisture content of about 5–25%.

3. The process of claim 1 wherein at least one flavoring ingredient is mixed with said pulverulent material and said water when the dough is formed.

4. The process of claim 3 in which flavoring ingredients are included in the dough which give the finished product a bacon-like flavor.

5. The process of claim 3 which includes shaping said dough by forcing it through an extruder having a die opening of a prescribed size and shape thereby forming an extrudate, and slicing said extrudate to form pellets having a prescribed size and shape.

6. The process of claim 5 which includes cooling said extruder so that the dough and the extrudate is maintained below a predetermined temperature.

7. The process of claim 6 wherein the dough within the extruder is maintained below about 140° F. and said dough is extruded under a pressure of 2200–3500 p.s.i.g.

8. The process of claim 1 wherein said grain is puffed 5–10 times its original volume.

9. The process of claim 1 wherein the pieces are deep fat fried in oil at about 350–400° F. for about 25–80 seconds, thereby reducing the moisture content of the pieces to about 1–3%.

10. The process of claim 9 which includes applying salt to the pieces after they have been deep fat fried.

11. The process of claim 1 which includes cooling the puffed grain after it has been exposively pulled.

12. The process of claim 1 in which water is added to the pulverulent material so that the moisture content of the resultant dough ranges from about 25–50%.

13. A process for forming a food product which comprises explosively puffing a cereal grain having a moisture content of about 8–22% by subjecting it to a temperature of at least 325° F. and a pressure of at least 60 p.s.i.g. and instantaneously releasing said pressure whereby steam explosion of the grain is obtained, thereby substantially completely gelatinizing the starch, milling the puffed grain to form a flour, forming a dough by combining and mixing said flour with at least one flavoring ingredient and enough water to raise the moisture content of the dough thus formed to at least 25%, forming the dough into an extrudate by forcing it through a die opening at a pressure ranging from about 2200–3500 p.s.i.g., maintaining the temperature of said dough during extrusion below about 140° F., cutting the extrudate into pieces, drying the pieces to a moisture level ranging from 5–25%, deep fat frying the dried pieces in oil at about 350–400° F. for 25–80 seconds, and applying salt to the fried pieces so that about 2% by weight is applied thereto.

References Cited

UNITED STATES PATENTS

| | | | |
|---|---|---|---|
| 766,212 | 8/1904 | Anderson | 99—82 |
| 1,933,158 | 10/1933 | Bohn et al. | 99—82 |
| 2,282,783 | 5/1942 | Musher | 99—82 |
| 3,348,950 | 10/1967 | Weiss | 99—81X |

ALVIN F. TANENHOLTZ, Primary Examiner

J. R. HOFFMAN, Assistant Examiner

U.S. Cl. X.R.

99—82, 93